United States Patent
Buchmann et al.

(10) Patent No.: US 9,822,693 B2
(45) Date of Patent: Nov. 21, 2017

(54) EXHAUST-GAS TURBOCHARGER

(71) Applicant: BorgWarner Inc., Auburns Hills, MI (US)

(72) Inventors: Daniel Buchmann, Neustadt (DE);
Thomas Fitting, Wonsheim (DE);
Oliver Schumnig, Gundersheim (DE)

(73) Assignee: BorgWarner Inc., Auburn Hills, MI (US)

( * ) Notice: Subject to any disclaimer, the term of this patent is extended or adjusted under 35 U.S.C. 154(b) by 249 days.

(21) Appl. No.: 14/371,869

(22) PCT Filed: Jan. 8, 2013

(86) PCT No.: PCT/US2013/020635
§ 371 (c)(1),
(2) Date: Jul. 11, 2014

(87) PCT Pub. No.: WO2013/109431
PCT Pub. Date: Jul. 25, 2013

(65) Prior Publication Data
US 2014/0348672 A1   Nov. 27, 2014

(30) Foreign Application Priority Data

Jan. 16, 2012   (DE) .................. 10 2012 000 738

(51) Int. Cl.
| | |
|---|---|
| *F04D 29/40* | (2006.01) |
| *F04D 29/60* | (2006.01) |
| *F04D 29/62* | (2006.01) |
| *F01D 25/24* | (2006.01) |

(Continued)

(52) U.S. Cl.
CPC .............. *F02B 37/00* (2013.01); *F01D 25/16* (2013.01); *F02C 6/12* (2013.01); *F04D 25/04* (2013.01);
(Continued)

(58) Field of Classification Search
CPC ............. F05D 2260/31; F05D 2260/33; F05D 2260/36; F05D 2260/37; F05D 2220/40;
(Continued)

(56) References Cited

U.S. PATENT DOCUMENTS 2,059,775 A * 11/1936 Clark .................... F16L 55/178
277/623
3,993,370 A * 11/1976 Woollenweber ...... F01D 25/166
384/287

(Continued)

FOREIGN PATENT DOCUMENTS

FR            2897893 A1 *  8/2007   ............ F01N 13/10

*Primary Examiner* — Peter J Bertheaud
(74) *Attorney, Agent, or Firm* — Eric L. Doyle; Stephan A. Pendorf; Patent Central LLC

(57) ABSTRACT

An exhaust-gas turbocharger (1) having a turbine housing (2), having a compressor housing (3), having a bearing housing (4), which has a bearing housing axis (L), and having a connecting device (5), for connecting the bearing housing (4) to the compressor housing (3) and/or the turbine housing (2). The connecting device has a plurality of connecting elements (6) which each have a connecting element end face (7). The number of bores (8) in the compressor housing (3) corresponds to the number of connecting elements (6). The bores (8) and the connecting elements (6) inserted into the bores (8) are arranged at an acute angle ($\alpha$) with respect to the bearing housing axis (L), and the connecting element end faces (7) rest on an associated bearing surface (9) of the bearing housing (4) and/or turbine housing (2).

13 Claims, 2 Drawing Sheets

(51) Int. Cl.
- *F01D 25/28* (2006.01)
- *F02B 37/00* (2006.01)
- *F02C 6/12* (2006.01)
- *F01D 25/16* (2006.01)
- *F04D 25/04* (2006.01)

(52) U.S. Cl.
CPC .......... *F01D 25/243* (2013.01); *F04D 29/403* (2013.01); *F04D 29/601* (2013.01); *F05D 2220/40* (2013.01); *F05D 2260/31* (2013.01); *F05D 2260/33* (2013.01); *F16C 2360/24* (2013.01)

(58) Field of Classification Search
CPC ........ F01D 25/16; F01D 25/24; F01D 25/243; F02C 6/12; F16C 2360/24; F04D 25/045; F04D 29/40; F04D 29/403; F04D 29/60; F04D 29/62; F04D 29/601
USPC .................................................. 417/405–407
See application file for complete search history.

(56) References Cited

U.S. PATENT DOCUMENTS

| | | | | |
|---|---|---|---|---|
| 4,235,484 A | * | 11/1980 | Owen | F01D 25/166 184/6.11 |
| 4,383,799 A | * | 5/1983 | Okano | F01D 25/243 403/326 |
| 4,747,806 A | * | 5/1988 | Krude | F16C 3/026 403/337 |
| 4,969,805 A | * | 11/1990 | Romeo | F01D 25/24 417/360 |
| 5,145,334 A | * | 9/1992 | Gutknecht | F01D 25/164 417/407 |
| 5,207,566 A | * | 5/1993 | Munkel | F01D 25/164 417/407 |
| 5,320,484 A | * | 6/1994 | Charbonnel | F01D 25/26 415/115 |
| 2013/0129502 A1 | * | 5/2013 | Schaefer | F01D 25/243 415/214.1 |

* cited by examiner

EXHAUST-GAS TURBOCHARGER

BACKGROUND OF THE INVENTION

Field of the Invention

The invention relates to an exhaust gas.

Description of the Related Art

To connect compressor housings and/or turbine housings to bearing housings of exhaust-gas turbochargers, use is made according to the prior art, for example, of screws with washers. The screws are screwed into a thread in the compressor housing and, via the washer, firmly clamp the bearing housing on the compressor housing. The screw insertion direction is in this case directed from the bearing housing toward the compressor housing. In applications in which the assembly direction is from the compressor side, usually only partially automated or manual assembly is possible, since the accessibility does not permit the delivery of the screws or automatic tightening of the screws.

It is therefore an object of the present invention to provide an exhaust-gas turbocharger of the type specified in the preamble of claim 1 which permits reduced assembly expenditure for the connection of the bearing housing to the compressor housing and/or turbine housing.

BRIEF SUMMARY OF THE INVENTION

As a result of the inclination of the connecting elements and bores in the final assembled state of the connecting elements, an arrangement of the bores and of the connecting elements at an angle and diametrically on an imaginary conical surface is obtained.

Furthermore, it is possible to easily mount the connecting elements and preferably to use connecting elements which have a hexagon socket and a so-called torx socket, which is a specific embodiment of a hexagon socket.

Furthermore, the advantage is attained that the assembly of the exhaust-gas turbocharger housing can be automated when implemented on the compressor side and turbine side, since the same insertion direction is possible.

Furthermore, the inclination of the bores in the compressor housing or turbine housing yields a reduction in axial installation space.

BRIEF DESCRIPTION OF THE SEVERAL VIEWS OF THE DRAWINGS

Further details, advantages and features of the present invention will emerge from the following description of exemplary embodiments on the basis of the drawing, in which.

DETAILED DESCRIPTION OF THE INVENTION

Figure 1:
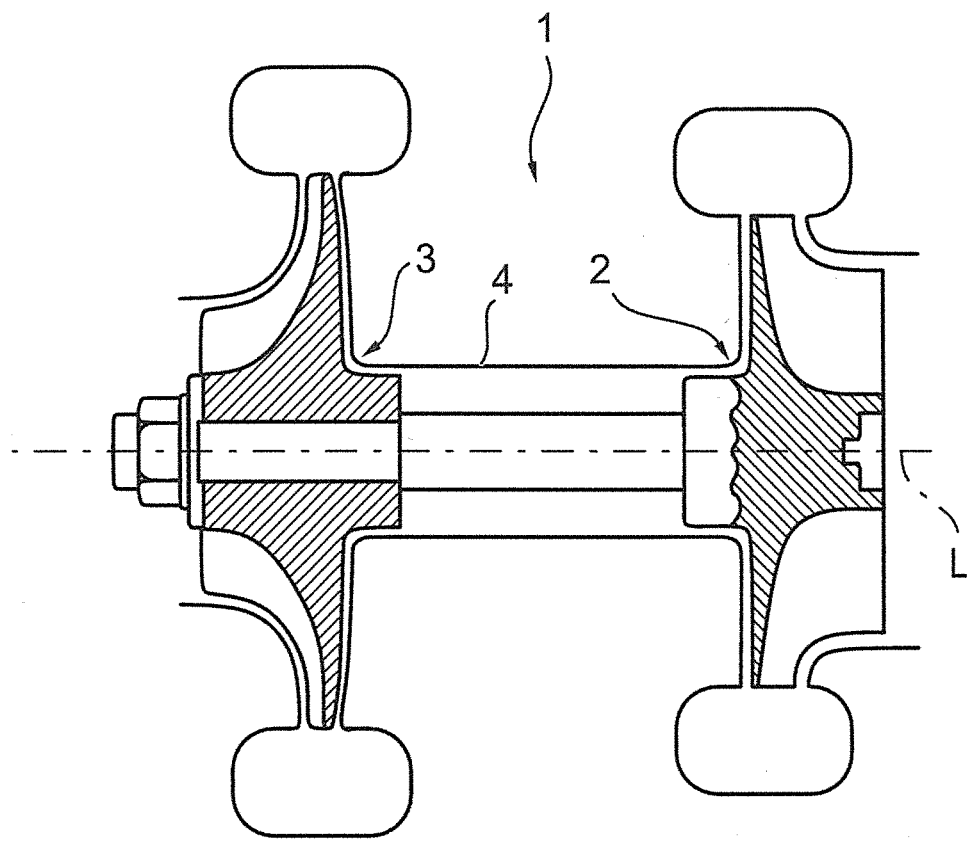
FIG. 1 shows a schematically greatly simplified illustration of an exhaust-gas turbocharger according to the invention.

The exhaust-gas turbocharger 1 according to the invention has, according to FIG. 1, a turbine housing 2, a compressor housing 3 and a bearing housing 4. The exhaust-gas turbocharger 1 according to the invention self-evidently also has all the other conventional components of modern turbochargers, but these are not described below since they are not required for explaining the principles of the present invention.

Figure 2:
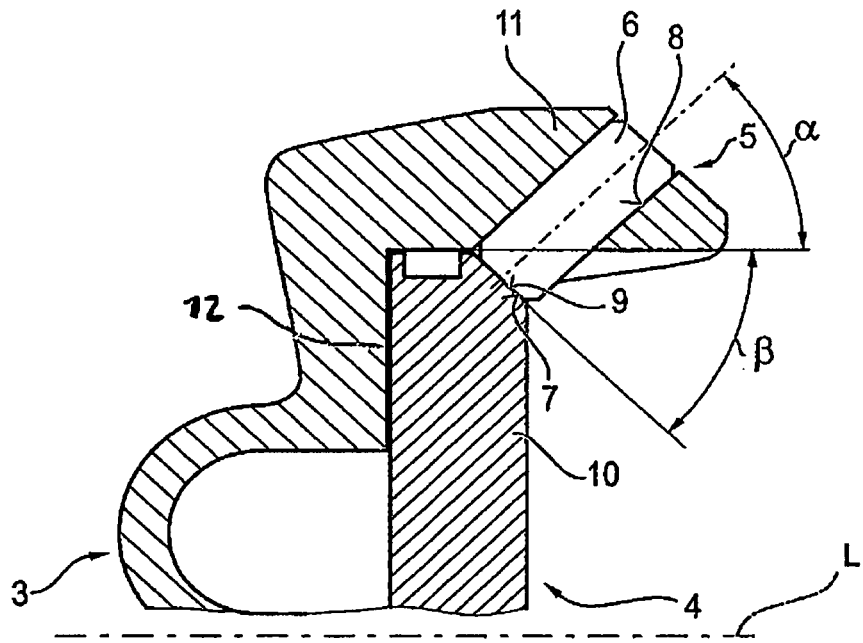
FIG. 2 shows a schematic simplified illustration of the bearing housing of the exhaust-gas turbocharger according to the invention, mounted on the compressor housing.

The bearing housing 4 may be connected to the compressor housing 3 by way of a connecting device 5, which, in the case of the example, has a plurality of screws as connecting elements, of which one screw 6 is illustrated representatively in FIG. 2.

Furthermore, the connecting device 5 has a number of bores in the form of threaded holes 8 in the compressor housing 3 which corresponds to the number of connecting elements 6 used. In FIG. 2, in turn, the threaded hole 8 is illustrated representatively for all the threaded holes provided.

As is also shown in FIG. 2, the threaded holes 8 and consequently the screws 6 screwed into said holes 8 are inclined, which means that they are arranged at an acute angle $\alpha$ with respect to the charger axis or bearing housing axis L. Preferred angle dimensions for the angle $\alpha$ are accordingly between 25° and 65° for the angle $\alpha$. A particularly preferred angle range is 45°±15°, that is to say between 30° and 60°.

Said angled arrangement results preferably in a symmetrical arrangement, provided on an imaginary conical surface, of the axes of the threaded holes 8 and of the screws 6.

As is also shown in FIG. 2, the screws 6 each have an end face 7, which rests on a bearing surface 9 of the bearing housing 4 when the screws 6 are screwed into the threaded holes 8. As FIG. 2 shows in this respect, the bearing surface 9 of the bearing housing or of a bearing housing rear wall or of a bearing housing flange 10 is beveled, such that the end face 7 of the screws 6 rests over the entire surface area of said bearing surface 9.

FIG. 2 also shows that the compressor housing 3 is provided with a fastening flange 11, in which the threaded holes 8 are made. To this end, the fastening flange 11 surrounds the connection region 10 (bearing housing rear wall or bearing housing flange), as can be inferred in detail from the illustration in FIG. 2.

The clamping force between screws 6 and abutment surface 12 is obtained in this arrangement from the tightening torque and the angle $\alpha$. The angle $\alpha$ or the angle $\beta$ of the bearing surface 9 complementary to the charger axis or bearing housing axis L, which is likewise shown in FIG. 2, can be varied in order to obtain the required clearance for tightening the screws 6. The beveling of the surface 9 (here 45°) in this respect reduces the contact pressure between said surface 9 and the end face 7 of the screw 6.

In principle, it is possible to provide a circumferential fastening flange 11 on the compressor housing 3, which is formed so as to protrude to such an extent in the direction toward the bearing housing 4 that, as shown in FIG. 2, it can encompass the connection region 10. Alternatively, it is possible to split this fastening flange 11 into a plurality of fastening lugs.

Figure 3:
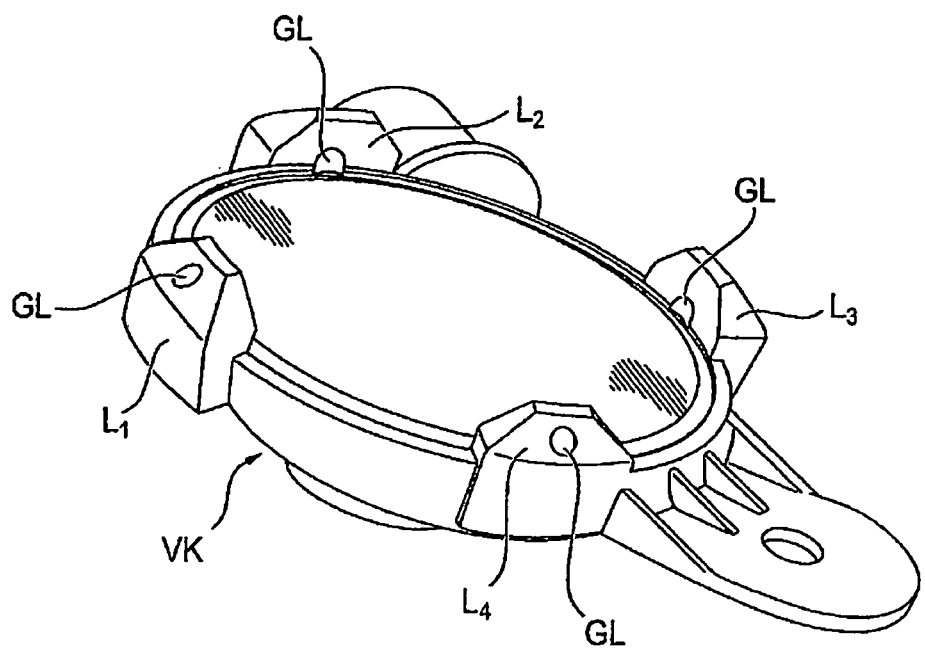
FIG. 3 shows a perspective illustration of a test piece.

In this respect, reference may be made to FIG. 3, which shows a test piece VK representing the compressor housing. In this illustration, the test piece VK has a total of four lugs L1 to L4, which are distributed uniformly around the circumference thereof and in each of which the aforementioned threaded holes (here denoted by the reference symbol "GL") are provided.

To simplify the illustration, the connection region of the bearing housing and the screws are not shown in FIG. 3.

Even though, in the preceding example, screws have been described as connecting elements and corresponding threaded bores or threaded holes have been described as bores, it is also possible to use other suitable elements, for example notched pins, clamping sleeves or the like, as connecting elements.

Depending on the nature of the connecting elements used, the bores have a thread and thus form threaded bores, or it is also possible to use bores without a thread, if this requires the use of the corresponding connecting elements.

In addition to the above written disclosure of the invention, reference is hereby explicitly made, to supplement said written disclosure, to the diagrammatic illustration in FIGS. 1 to 3.

LIST OF REFERENCE SYMBOLS

1 Exhaust-gas turbocharger
2 Turbine housing
3 Compressor housing
4 Bearing housing
5 Connecting device
6 Connecting elements (e.g. screw, notched pin, clamping sleeve)
7 End faces
8 Bores with a thread (threaded bores) or without a thread
9 Bearing surface
10 Connection region of the bearing housing 4, for example in the form of a bearing housing flange or a bearing housing rear wall
11 Fastening flange, possibly split into a plurality of lugs
$\alpha, \beta$ Angle
L Bearing housing axis or charger axis
VK Test piece
L1-L4 Lugs
GL Threaded holes

What is claimed is:
1. An exhaust-gas turbocharger (1) with
a turbine housing (2),
a compressor housing (3),
a bearing housing (4), which has a bearing housing axis (L), and
a connecting device (5),
for connecting the bearing housing (4) to at least one of the compressor housing (3) and the turbine housing (2),
which has a plurality of connecting elements (6) which each have a connecting element end face (7), and
wherein a number of bores (8) in the compressor or turbine housing (2, 3) connected to the bearing housing via the connecting device (5) correspond to the number of connecting elements (6), and
wherein
the bores (8) and the connecting elements (6) inserted into the bores (8) are arranged at an acute angle (a) with respect to the bearing housing axis (L), and
the connecting element end faces (7) rest on an associated bearing surface (9) of the bearing housing (4).
2. The exhaust-gas turbocharger as claimed in claim 1, wherein axes (S) of the connecting elements (6) and of the bores (8) are arranged symmetrically on an imaginary conical surface.
3. The exhaust-gas turbocharger as claimed in claim 1, wherein the acute angle ($\alpha$) is an angle of from approximately 25° to approximately 65°.
4. The exhaust-gas turbocharger as claimed in claim 1, wherein the bores (8) are arranged in a fastening flange (11) of the compressor or turbine housing (2, 3) connected to the bearing housing via the connecting device (5), wherein said fastening flange (11) surrounds a connecting region (10) of the bearing housing (4).
5. The exhaust-gas turbocharger as claimed in claim 4, wherein the fastening flange (11) is divided into a plurality of lugs.
6. The exhaust-gas turbocharger as claimed in claim 1, wherein the bearing surface (9) is beveled.
7. The exhaust-gas turbocharger as claimed in claim 1, wherein the acute angle ($\alpha$) is an angle of from approximately 30° to approximately 60°.
8. A compressor housing (3) or turbine housing adapted to mating to a beveled surface of a circumferential bearing surface (9) having a center axis (L), with
at least one fastening flange (11),
a plurality of threaded bores (8), which are arranged in the at least one fastening flange (11) spaced apart from one another in a circumferential direction,
a threaded connecting element (6) in each of said threaded bores (8), and
an abutment surface (12), wherein a clamping space is defined between the abutment surface (12) and the circumferential bearing surface (9),
wherein each of the threaded bores (8) respectively is arranged at an acute angle ($\alpha$) with respect to the axis (L), and
wherein each threaded bore has a bore axis (S), and wherein the axes (S) of the threaded bores (8) are arranged symmetrically on an imaginary conical surface such that said compressor housing (3) or turbine housing (2) is adapted to being fixed by clamping action between the connecting elements (6) and abutment surface (12) at any rotational position relative to the beveled surface.
9. The compressor housing or turbine housing as claimed in claim 8, wherein the acute angle ($\alpha$) is an angle of from approximately 20° to approximately 65°.
10. The compressor housing or turbine housing as claimed in claim 8, wherein the at least one fastening flange (11) is divided into a plurality of lugs, which are arranged spaced apart from one another and in which the bores (8) are provided.
11. The compressor housing as claimed in claim 9, wherein the acute angle ($\alpha$) is an angle of from approximately 30° to approximately 60°.
12. The compressor housing or turbine housing as claimed in claim 8, wherein the connecting element includes a hexagonal socket.
13. The compressor housing or turbine housing as claimed in claim 8, wherein the connecting element includes a torx socket.

* * * * *